US008743301B2

(12) United States Patent
Shin (10) Patent No.: US 8,743,301 B2
(45) Date of Patent: Jun. 3, 2014

(54) LIQUID CRYSTAL DISPLAY DEVICE PROVIDED WITH AN ELECTRODE FOR SENSING A TOUCH OF A USER

(75) Inventor: HeeSun Shin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/297,385

(22) Filed: Nov. 16, 2011

(65) Prior Publication Data
US 2012/0127414 A1 May 24, 2012

(30) Foreign Application Priority Data
Nov. 22, 2010 (KR) .......................... 10-2010-0116166

(51) Int. Cl.
*G02F 1/1335* (2006.01)

(52) U.S. Cl.
USPC ............................................ 349/12; 345/173

(58) Field of Classification Search
USPC ........ 349/139, 143, 141, 12, 42–43; 345/173; 178/18.01–20.04; 257/59, 72; 315/173
See application file for complete search history.

(56) References Cited

U.S. PATENT DOCUMENTS

| 2009/0115735 | A1 | 5/2009 | Chuang |
| 2010/0194710 | A1 | 8/2010 | Koito et al. |
| 2011/0157039 | A1* | 6/2011 | Shin et al. ..................... 345/173 |
| 2011/0227850 | A1* | 9/2011 | Oh et al. ........................ 345/173 |
| 2011/0227851 | A1* | 9/2011 | Oh et al. ........................ 345/173 |
| 2012/0268396 | A1* | 10/2012 | Kim et al. ..................... 345/173 |

FOREIGN PATENT DOCUMENTS

| CN | 102109722 A | 6/2011 |
| KR | 100870105 B1 | 11/2008 |

OTHER PUBLICATIONS

The First Office Action dated Jan. 6, 2014 from The State Intellectual Property Office of the People's Republic of China in counterpart Chinese application No. 201110379223.X.

* cited by examiner

*Primary Examiner* — Mark Robinson
*Assistant Examiner* — Zachary A Nemtzow
(74) *Attorney, Agent, or Firm* — Morgan, Lewis & Bockius LLP

(57) ABSTRACT

A liquid crystal display device and a method for manufacturing the same are disclosed. The liquid crystal display device comprises gate and data lines arranged to cross each other on a substrate to define a plurality of pixels; a pixel electrode formed in each of the plurality of pixels; a common electrode forming an electric field together with the pixel electrode, patterned to sense a touch of a user; a sensing line discontinuously formed on the common electrode and electrically connected with the common electrode; a jump line formed below the common electrode to electrically connect discontinuous portions of the sensing line with one another; and first and second connection electrodes for electrically connecting the jump line with the sensing line, wherein the first connection electrode is connected with the jump line, and the second connection electrode is connected with the sensing line and the first connection electrode respectively.

8 Claims, 8 Drawing Sheets

LIQUID CRYSTAL DISPLAY DEVICE PROVIDED WITH AN ELECTRODE FOR SENSING A TOUCH OF A USER

CROSS REFERENCE TO RELATED APPLICATIONS

This application claims the benefit of the Korean Patent Application No. 10-2010-0116166 filed on Nov. 22, 2010, which is hereby incorporated by reference for all purposes as if fully set forth herein.

BACKGROUND OF THE INVENTION

1. Field of the Invention

The present invention relates to a liquid crystal display device, and more particularly, to a liquid crystal display device provided with a sensing electrode for sensing a touch of a user.

2. Discussion of the Related Art

A liquid crystal display device is widely used in various fields of notebook computers, monitors, spacecraft, aircraft, and etc. owing to advantages of low power consumption based on a low driving voltage and portability.

The liquid crystal display device includes a lower substrate, an upper substrate, and a liquid crystal layer formed between the lower and upper substrates. In the liquid crystal display device, an alignment state of liquid crystal molecules in the liquid crystal layer is controlled based on whether or not an electric field is applied thereto, and light transmittance is controlled according to the alignment state of liquid crystal molecules, whereby images are displayed thereon.

It is general that a mouse or key board is used as an input means of the liquid crystal display device. However, a touch screen, which can allow a user to directly input information using a finger or pen, is mainly applied to a navigation system, a portable terminal and electric home appliances.

Hereinafter, a related art liquid crystal display device provided with a touch screen will be described with reference to the accompanying drawings.

Figure 1:
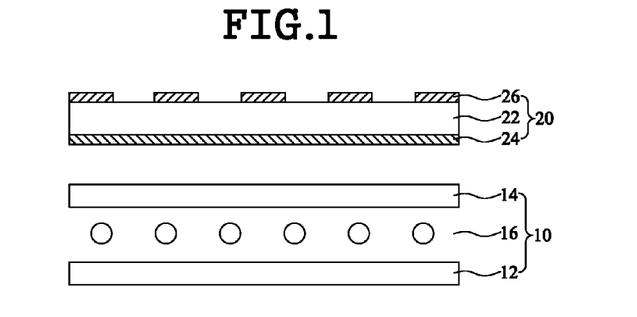
FIG. 1 is a cross-sectional view illustrating the related art liquid crystal display device.

FIG. 1 is a cross-sectional view illustrating the related art liquid crystal display device.

As shown in FIG. 1, the related art liquid crystal display device includes a liquid crystal panel 10 and a touch screen 20.

The liquid crystal panel 10 displays images, and includes a lower substrate 12, an upper substrate 14, and a liquid crystal layer 16 formed between these substrates 12 and 14.

The touch screen 20 is formed on the liquid crystal panel 10 to sense a touch of a user, and includes a touch substrate 22, a first sensing electrode 24 formed below the touch substrate 22, and a second sensing electrode 26 formed on the touch substrate 22.

The first sensing electrode 24 is arranged below the touch substrate 22 in a horizontal direction, and the second sensing electrode 26 is arranged on the touch substrate 22 in a vertical direction. Accordingly, if the user touches a predetermined position, capacitance between the first sensing electrode 24 and the second sensing electrode 26 is varied at the touched position. As a result, the position where capacitance is varied is sensed, whereby the touch position of the user can be sensed.

However, in the aforementioned related art liquid crystal display device, since the touch screen 20 is separately formed on the liquid crystal panel 20, the overall thickness of the liquid crystal display device is increased by the touch screen 20. For this reason, problems occur in that manufacturing process steps are complicated and the manufacturing cost is increased.

SUMMARY OF THE INVENTION

Accordingly, the present invention is directed to a liquid crystal display device and a method for manufacturing the same that substantially obviates one or more problems due to limitations and disadvantages of the related art.

An advantage of the present invention is to provide a liquid crystal display device and a method for manufacturing the same, in which a sensing electrode for sensing a touch of a user is built in a liquid crystal panel so as not to require a separate touch screen on the liquid crystal panel, whereby the overall thickness of the liquid crystal display device is reduced, manufacturing process steps are simplified, and the manufacturing cost is reduced.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises gate and data lines arranged to cross each other on a substrate to define a plurality of pixels; a pixel electrode formed in each of the plurality of pixels; a common electrode forming an electric field together with the pixel electrode, patterned to sense a touch of a user; a sensing line discontinuously formed on the common electrode and electrically connected with the common electrode; a jump line formed below the common electrode to electrically connect discontinuous portions of the sensing line with one another; and first and second connection electrodes for electrically connecting the jump line with the sensing line, wherein the first connection electrode is connected with the jump line, and the second connection electrode is connected with the sensing line and the first connection electrode respectively.

In another aspect of the present invention, a method for manufacturing a liquid crystal display device comprises the steps of patterning a jump line on a substrate; forming an interlayer insulating film on the jump line; forming a first contact hole in the interlayer insulating film to expose the jump line; forming a first connection electrode connected with the jump line through the first contact hole; forming a first passivation film by sequentially depositing an inorganic film and an organic film on the first connection electrode; forming an opening in the organic film of the first passivation film; patterning a common electrode on the organic film of the first passivation film and patterning a sensing line on the common electrode; forming a second passivation film on the sensing line; forming a second contact hole to expose the sensing line and the first connection electrode by removing a predetermined region of the second passivation film and a predetermined region of the inorganic film of the first passivation film; and forming a second connection electrode connected with the sensing line and the first connection electrode through the second contact hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2b is a cross-sectional view taken along line I-I of FIG. 2a;

FIG. 3b is a cross-sectional view taken along line I-I of FIG. 3a;

FIGS. 6a to 6h are cross-sectional views illustrating a method for manufacturing a lower substrate for a liquid crystal display device according to one embodiment of the present invention; and FIGS. 7a to 7h are cross-sectional views illustrating a method for manufacturing a lower substrate for a liquid crystal display device according to another embodiment of the present invention.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Figure 2A:
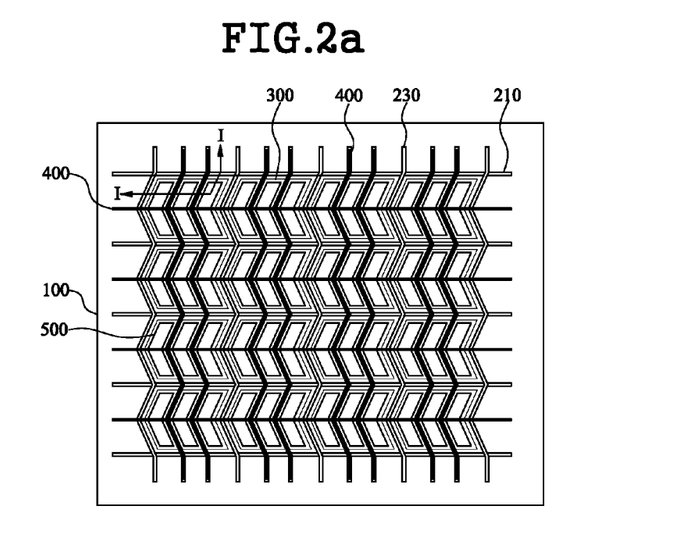
FIG. 2a is a plane view illustrating a lower substrate for a liquid crystal display device according to one embodiment of the present invention.
Figure 2B:
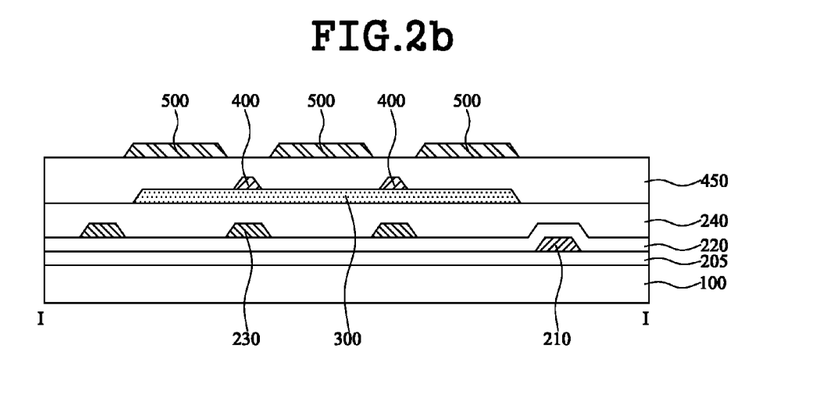

FIG. 2a is a plane view illustrating a lower substrate for a liquid crystal display device according to one embodiment of the present invention, and FIG. 2b is a cross-sectional view taken along line I-I of FIG. 2a.

As shown in FIG. 2a, the liquid crystal display device according to one embodiment of the present invention includes a substrate 100, a gate line 210, a data line 230, a common electrode 300, a sensing line 400, and a pixel electrode 500.

The substrate 100 may be formed of glass or transparent plastic.

The gate line 210 is arranged on the substrate 100 in a horizontal direction, and the data line 230 is arranged on the substrate 100 in a vertical direction. In this way, the gate line 210 and the data line 230 cross each other to define a plurality of pixels.

The gate line 210 is arranged in a straight line, and the data line 230 is arranged in a curved line. However, the arrangements of the gate line 210 and the data line 230 are not limited to the above examples. For example, the data line 230 may be arranged in a straight line.

Meanwhile, although not shown, each of the plurality of pixels is provided with a thin film transistor as a switching device. The thin film transistor includes a gate electrode, a semiconductor layer, and source and drain electrodes. The thin film transistor may have a bottom gate structure where the gate electrode is arranged below the semiconductor layer and a top gate structure where the gate electrode is arranged over the semiconductor layer.

The common electrode 300 serves to drive the liquid crystal layer by forming an electric field together with the pixel electrode 500, and also serves as a sensing electrode for sensing a touch position of a user.

In order to serve as the sensing electrode, a plurality of the common electrodes 300 are formed in a predetermined pattern. Each of the plurality of common electrodes 300 may be formed to have a size corresponding to one or more pixels. For example, each of the plurality of common electrodes 300 may be formed to have a size corresponding to three pixels as shown.

The sensing line 400 serves to electrically connect the plurality of common electrodes 300 with one another. In other words, the plurality of common electrodes which are separately formed are connected with the sensing line 400, and a sensing circuit is connected with the end of the sensing line 400 to sense the touch position of the user. The sensing line 400 is arranged in parallel with the gate line 210 as well as the data line 230, whereby the touch positions in X-axis direction and Y-axis direction can be sensed.

The sensing line 400 serves to electrically connect the plurality of common electrodes 300 with one another and also serves to reduce resistance of the common electrodes. Also, the sensing line 400 may serve to prevent disclination from occurring. This sensing line 400 will be described in more detail as follows.

A transparent conductive material such as ITO is generally used as the common electrode 300. However, a problem occurs in that the transparent conductive material has high resistance. Accordingly, the sensing line 400 of metal having excellent conductivity may be connected with the common electrode 300, so that resistance of the common electrode 300 may be reduced.

Also, as shown in FIG. 2a, if the data line 230 is formed in a curved line, light leakage occurs in a region where the data line 230 is curved, whereby disclination may occur. Accordingly, the sensing line 400 arranged in parallel with the gate line 210 may be formed in the region where disclination occurs, whereby disclination may be prevented from occurring.

Meanwhile, although disclination may be prevented from occurring through the sensing line 400, an aperture ratio may be reduced by the sensing line 400. Accordingly, to prevent the aperture ratio from being reduced, the sensing line 400 arranged in parallel with the data line 230 may preferably be overlapped with the data line 230. In order to reduce resistance of the common electrode 300 while preventing light transmittance from being reduced, the sensing line 400 overlapped with the gate line 210 may additionally be formed.

The pixel electrode 500 is formed in each of the pixels, and is especially formed to correspond to a shape of the pixel.

Meanwhile, although not shown, the pixel electrode 500 may be provided with at least one slit therein. If the pixel electrode 500 is provided with a slit therein, a fringe field may be formed between the pixel electrode 500 and the common electrode 300 through the slit, and the liquid crystal may be driven by the fringe field. In other words, a fringe field switching mode liquid crystal display device may be obtained.

Hereinafter, the liquid crystal display device according to one embodiment of the present invention will be described in more detail with reference to FIG. 2b illustrating a sectional structure of the liquid crystal display device.

As shown in FIG. 2b, a gate insulating film 205 is formed on the substrate 100, and the gate line 210 is patterned on the gate insulating film 205. This corresponds to a case where a thin film transistor of a top gate structure is used. Although not shown, the semiconductor layer is formed below the gate insulating film 205. The semiconductor layer includes a channel region where electrons are moved, and a doping region connected with the source and drain electrodes at both sides of the channel region.

An interlayer insulating film 220 is formed on the gate line 210, and the data line 230 is patterned on the interlayer insulating film 220. And, a first passivation film 240 is formed on the data line 230.

The common electrode 300 is patterned on the first passivation film 240, and the sensing line 400 is patterned on the common electrode 300.

A second passivation film 450 is formed on the sensing line 400, and the pixel electrode 500 is patterned on the second passivation film 450.

Meanwhile, as described above, the sensing line 400 electrically connects the common electrodes 300 with one another and senses touch positions of the user in X-axis direction and Y-direction. This will be described in more detail as follows.

Figure 3A:
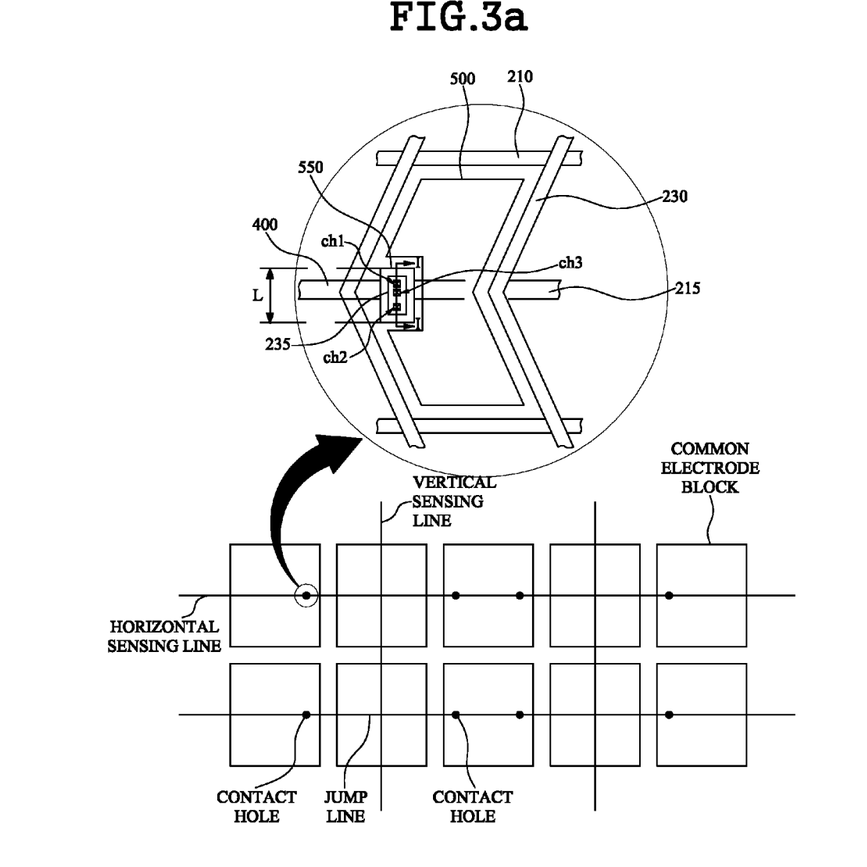
FIG. 3a is a brief view illustrating a sensing line configured to sense a touch position of a user in a liquid crystal display device according to one embodiment of the present invention.
Figure 3B:
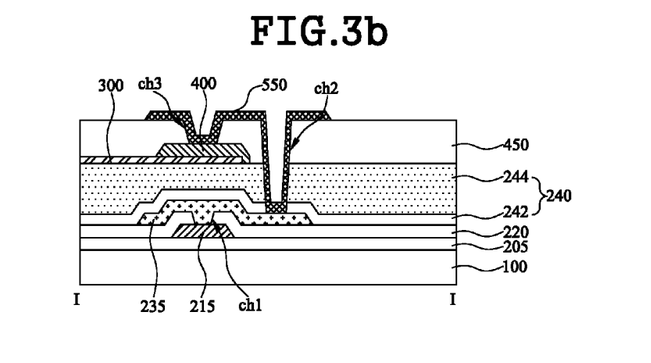

FIG. 3a is a brief view illustrating a sensing line configured to sense a touch position of a user in a liquid crystal display device according to the present invention, and FIG. 3b is a cross-sectional view taken along line I-I of FIG. 3a. In FIG. 3a, one sensing line in one common electrode block is shown for convenience sake.

As shown in FIG. 3a, a common electrode block including a plurality of common electrodes is formed in consideration of a contact area of the hand of the user or pen. Namely, a common electrode block is a unit block including the plurality of common electrodes. For example, the aggregation of the common electrodes shown in FIG. 2a may be one unit block.

Also, the respective common electrode blocks are connected with each other using the sensing line.

Since the sensing line includes a horizontal sensing line and a vertical sensing line, a touch position of Y-axis direction may be sensed through the horizontal sensing line that senses capacitance variation during the touch of the user, and a touch position of X-axis direction may be sensed through the vertical sensing line that senses capacitance variation during the touch of the user.

In this case, if the horizontal sensing line is electrically connected with the vertical sensing line, short occurs, whereby the touch position of the user cannot be sensed. Accordingly, the horizontal sensing line and the vertical sensing line, which are used to sense the touch position of the user, should not be electrically connected with each other.

In order that the horizontal sensing line and the vertical sensing line should not be electrically connected with each other, a jump line is used. In FIG. 3a, the sensing line is shown in a solid line and the jump line is shown in a dotted line.

In more detail, the horizontal sensing line and the vertical sensing line are formed on the common electrode block. At this time, the horizontal sensing line is formed discontinuously so as not to cross the vertical sensing line. The jump line is formed below the common electrode block. At this time, the jump line is connected with the horizontal sensing line through a contact hole, whereby portions of the horizontal sensing line formed discontinuously are electrically connected with one another.

Although the portions of the horizontal sensing line formed discontinuously are connected with one another using the jump line in the drawing, the vertical sensing line may be formed discontinuously and its discontinuous portions may be connected with one another using the jump line.

Hereinafter, electrical connection between the sensing line and the jump line will be described in more detail with reference to the enlarged view of FIG. 3a.

The enlarged view of FIG. 3a illustrates one pixel where the sensing line is connected with the jump line. As shown in FIG. 3a, the gate line 210 and the data line 230 cross each other to define one pixel. The pixel electrode 500 is formed in the pixel.

Also, the sensing line 400 is formed in parallel with the gate line 210, and the jump line 215 is formed to be electrically connected with the sensing line 400.

The jump line 215 may be formed in parallel with the gate line 210 in the same manner as the sensing line 400. Particularly, the jump line 215 is formed in a region where disclination occurs, whereby disclination can be prevented from occurring.

In this case, since the sensing line 400 is formed on the common electrode and the jump line 215 is formed below the common electrode, a first connection electrode 235 and a second connection electrode 550 are additionally formed to electrically connect the sensing line 400 with the jump line 215.

The first connection electrode 235 is connected with the jump line 215, the second connection electrode 550 is connected with the sensing line 400, and the first connection electrode 235 and the second connection electrode 550 are connected with each other. Accordingly, the jump line 215 is electrically connected with the sensing line 400.

In more detail, the first connection electrode 235 is connected with the jump line 215 through a first contact hole ch1, and is connected with the second connection electrode 550 through a second contact hole ch2.

The second connection electrode 550 is connected with the first connection electrode 235 through the second contact hole ch2, and is connected with the sensing line 400 through a third contact hole ch3.

The connection structure of the jump line 215 and the sensing line 400 will be understood more easily with reference to FIG. 3b illustrating a section thereof.

As shown in FIG. 3b, the gate insulating film 205 is formed on the substrate 100, and the jump line 215 is formed on the gate insulating film 205.

As described above, the semiconductor layer, which includes a channel region and a doping region, is formed below the gate insulating film 205.

The jump line 215 may be formed in the same layer as the gate line 210. Accordingly, the jump line 215 may be formed of the same material as that of the gate line 210 through the same process as that of the gate line 210.

The interlayer insulating film 220 is formed on the jump line 215, and the first connection electrode 235 is formed on the interlayer insulating film 220.

The interlayer insulating film 220 is provided with the first contact hole ch1 to expose the jump line 215, and the first connection electrode 235 is connected with the jump line 215 through the first contact hole ch1.

The first connection electrode 235 may be formed in the same layer as the data line 230. Accordingly, the first connection electrode 235 may be formed of the same material as that of the data line 230 through the same process as that of the data line 230.

The first passivation film 240 is formed on the first connection electrode 235.

The first pasesivation film 240 may be formed of a double film that includes an inorganic film 242 and an organic film 244.

If the organic film 244 is thickly formed as the first passivation film 240, it is preferable that parasitic capacitance can be reduced. If the organic film 244 is formed on the first connection electrode 235, the first connection electrode 235 may be eroded. Accordingly, it is preferable that the inorganic film 242 is thinly formed on the first connection electrode 235 and then the thick organic film 244 is formed.

The common electrode 300 is patterned on the first passivation film 240, and the sensing line 400 is patterned on the common electrode 300.

The second passivation film 450 is formed on the sensing line 400, and the second connection electrode 550 is formed on the second passivation film 450.

The second contact hole ch2 is formed in the first passivation film 240 and the second passivation film 450 to expose the first connection electrode 235, and the second connection electrode 550 is connected with the first connection electrode 235 through the second contact hole ch2.

Also, the third contact hole ch3 is formed in the second passivation film 450 to expose the sensing line 400, and the second connection electrode 550 is connected with the sensing line 400 through the third contact hole ch3.

The second connection electrode 550 is formed in the same layer as the pixel electrode 500. Accordingly, the second connection electrode 550 may be formed of the same material as that of the pixel electrode 500 through the same process as that of the pixel electrode 500.

As described above, according to one embodiment of the present invention, the jump line 215 is electrically connected with the sensing line 400 through the first connection electrode 235 and the second connection electrode 550. For these connection, a total of three contact holes such as the first contact hole ch1, the second contact hole ch2 and the third contact hole ch3 are formed.

Particularly, since the second contact hole ch2 and the third contact hole ch3 are separately formed to connect the second connection electrode 550 with the first connection electrode 235 and the sensing line 400 respectively, as will be aware of it from the enlarged view of FIG. 3a, the length L of the second connection electrode 550 is increased. However, if the length L of the second connection electrode L is increased, the overall area of the pixel electrode 500 spaced apart from the second connection electrode 550 is reduced. For this reason, a problem occurs in that an aperture ratio may be reduced.

Hereinafter, a lower substrate for a liquid crystal display device according to another embodiment of the present invention, which can solve the above problem, will be described.

Figure 4:
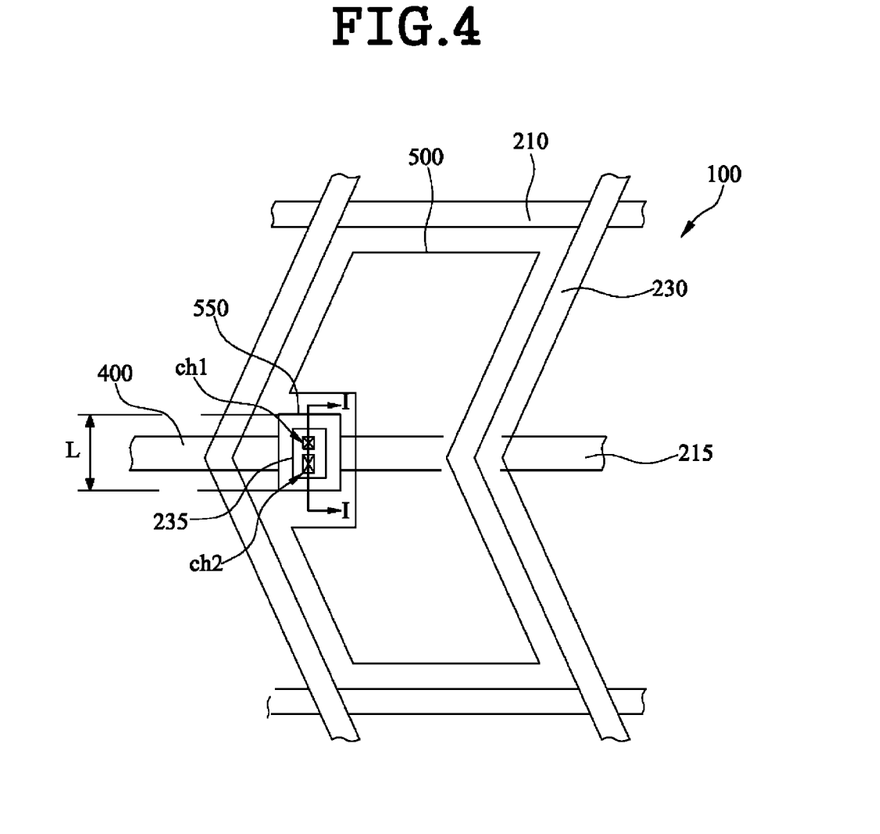
FIG. 4 is a plane view illustrating one pixel of a liquid crystal display device according to another embodiment of the present invention.

FIG. 4 is a plane view illustrating one pixel of a liquid crystal display device according to another embodiment of the present invention. FIG. 4 shows the connection between a sensing line and a jump line.

As shown in FIG. 4, a gate line 210 and a data line 230 are arranged on a substrate 100 to cross each other, whereby one pixel is defined. The pixel is provided with a pixel electrode 500 therein.

Also, a sensing line 400 is formed in parallel with the gate line 210, and a jump line 215 is formed to be electrically connected with the sensing line 400. The jump line 215 may be formed in parallel with the gate line 210 in the same manner as the sensing line 400. Particularly, the jump line 215 may be formed in a region where disclination occurs, to prevent disclination from occurring.

The sensing line 400 is formed on a common electrode and the jump line 215 is formed below the common electrode. Accordingly, a first connection electrode 235 and a second connection electrode 550 are formed to electrically connect the sensing line 400 with the jump line 215.

The first connection electrode 235 is connected with the jump line 215, and the second connection electrode 550 is connected with the sensing line 400. Also, the first connection electrode 235 and the second connection electrode 550 are connected with each other. Accordingly, the jump line 215 is electrically connected with the sensing line 400.

In more detail, the first connection electrode 235 is connected with the jump line 215 through a first contact hole ch1, and is connected with the second connection electrode 550 through a second contact hole ch2.

The second connection electrode 550 is connected with the first connection electrode 235 through the second contact hole ch2, and is also connected with the sensing line 400 through the second contact hole ch2. Namely, the second connection electrode 550 is connected with the first connection electrode 235 and the sensing line 400 through one second contact hole ch2.

Figure 5A:
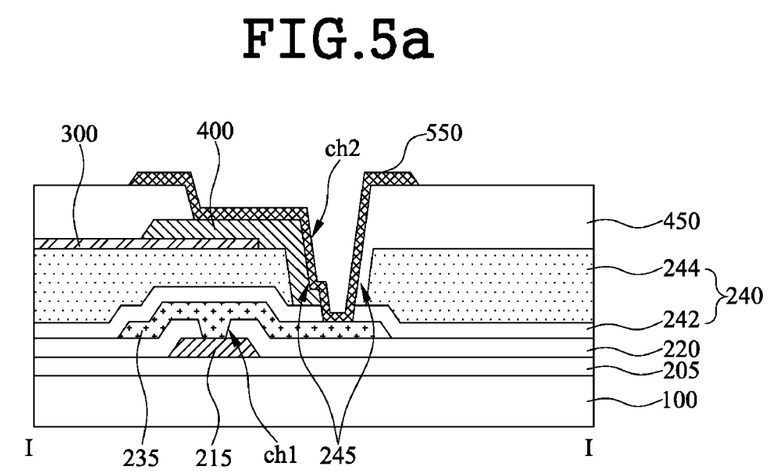
FIGS. 5a and 5b are cross-sectional views of a liquid crystal display device according to various embodiments of the present invention, which are taken along line I-I of FIG. 4.
Figure 5B:
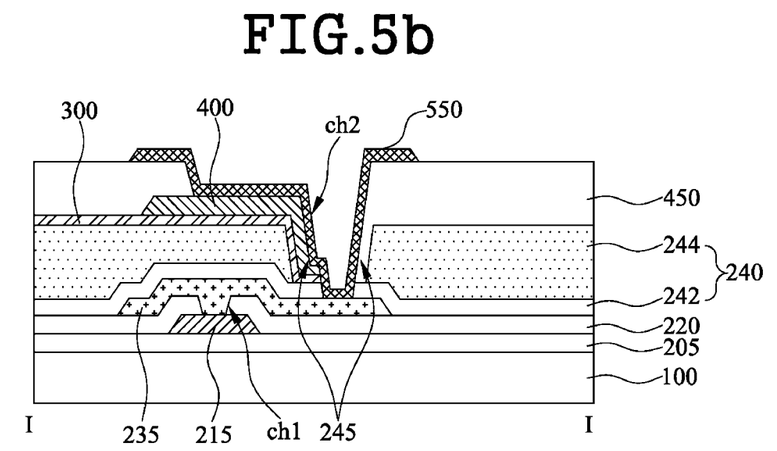

The connection structure of the jump line 215 and the sensing line 400 will be described with reference to FIGS. 5a and 5b illustrating a section thereof.

FIGS. 5a and 5b are cross-sectional views taken along line I-I of FIG. 4 according to various embodiments of the present invention.

As shown in FIG. 5a, the gate insulating film 205 is formed on the substrate 100, and the jump line 215 is formed on the gate insulating film 205.

As described above, the semiconductor layer, which includes a channel region and a doping region, is formed below the gate insulating film 205.

The jump line 215 may be formed in the same layer as the gate line 210. Accordingly, the jump line 215 may be formed of the same material as that of the gate line 210 through the same process as that of the gate line 210.

The interlayer insulating film 220 is formed on the jump line 215, and the first connection electrode 235 is formed on the interlayer insulating film 220.

The interlayer insulating film 220 is provided with the first contact hole ch1 to expose the jump line 215, and the first connection electrode 235 is connected with the jump line 215 through the first contact hole ch1.

The first connection electrode 235 may formed in the same layer as the data line 230. Accordingly, the first connection electrode 235 may be formed of the same material as that of the data line 230 through the same process as that of the data line 230.

The first passivation film 240 is formed on the first connection electrode 235. In this case, the first passivation film 240 may be formed of a double film that includes an inorganic film 242 and an organic film 244.

The common electrode 300 is patterned on the first passivation film 240, and the sensing line 400 is patterned on the common electrode 300.

The second passivation film 450 is formed on the sensing line 400, and the second connection electrode 550 is formed on the second passivation film 450.

The second contact hole ch2 is formed in the first passivation film 240 and the second passivation film 450 to expose the first connection electrode 235 and the sensing line 400 together, and the second connection electrode 550 is connected with the first connection electrode 235 and the sensing line 400 through the second contact hole ch2.

In more detail, the second contact hole ch2 is formed by removing a predetermined region of the inorganic film 242 of the first passivation film 240 and a predetermined region of the second passivation film 450.

The organic film 244 of the first passivation film 240 is provided with a separate opening 245, and the sensing line 400 is patterned in the opening 245. Also, the second passivation film 450 may partially be formed in the opening 245. Finally, the second contact hole ch2 is formed by removing the second passivation film 450 formed in the opening 245 and the inorganic film 242 below the second passivation film 450. The opening 245 and the second contact hole ch2 will be understood more easily with reference to a manufacturing process which will be described later.

The second connection electrode 550 is formed in the same layer as the pixel electrode 500. Accordingly, the second connection electrode 550 may be formed of the same material as that of the pixel electrode 500 through the same process as that of the pixel electrode 500.

Since the embodiment according to FIG. 5b is the same as that of FIG. 5a except that the sensing line 400 and the common electrode 300 are additionally patterned in the opening 245 formed in the organic film 244 of the first passivation film 240 in the embodiment of FIG. 5a, its repeated description will be omitted.

As described above, according to another embodiment of the present invention, the jump line 215 is electrically connected with the sensing line 400 through the first connection electrode 235 and the second connection electrode 550. For this connections, a total of two contact holes such as the first contact hole ch1 and the second contact hole ch2 are formed.

Particularly, since the second contact hole ch2 is only formed to connect the second connection electrode 550 with the first connection electrode 235 and the sensing line 400 respectively, as will be aware of it from FIG. 4, the length L of the second connection electrode 550 is reduced as compared with the aforementioned embodiment. Accordingly, the overall area of the pixel electrode 500 spaced apart from the second connection electrode 550 is relatively increased, whereby an aperture ratio may be increased.

Hereinafter, a method for manufacturing a lower substrate for a liquid crystal display device according to the present invention will be described.

FIGS. 6a to 6h are cross-sectional views illustrating a method for manufacturing a lower substrate for a liquid crystal display device according to an embodiment of the present invention, and are directed to a method for manufacturing a lower substrate for the liquid crystal display device according to FIG. 5a.

Figure 6A:
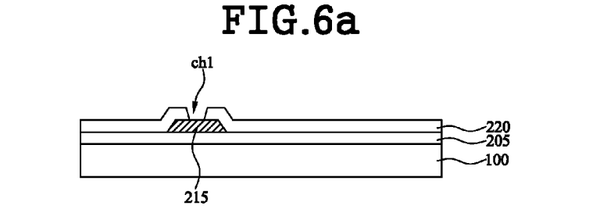

First, as shown in FIG. 6a, a gate insulating film 205 is formed on a substrate 100, and a jump line 215 is patterned on the gate insulating film 205. After a interlayer insulating film 220 is formed on the jump line 215, a first contact hole ch1 is formed in the interlayer insulating film 220 to expose the jump line 215.

The process of forming a semiconductor layer on the substrate 100 may be performed before the gate insulating film 205 is formed.

The jump line 215 may be formed simultaneously with the gate line.

The first contact hole ch1 may be formed simultaneously with a contact hole formed to connect the semiconductor layer with the source and drain electrodes.

As described above, since the jump line 215 and the first contact hole ch1 may be formed using the existing process, a separate process is not required additionally to form the jump line 215 and the first contact hole ch1.

Figure 6B:
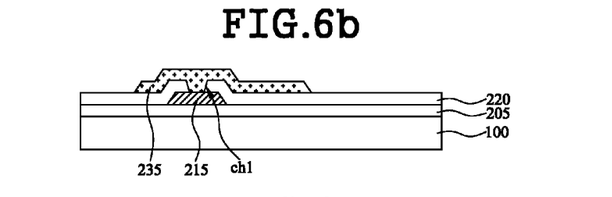

Next, as shown in FIG. 6b, a first connection electrode 235 connected with the jump line 215 through the first contact hole ch1 is formed.

The first connection electrode 235 may be formed simultaneously with a data line. Accordingly, a separate process for forming the first connection electrode 235 is not required additionally.

Figure 6C:
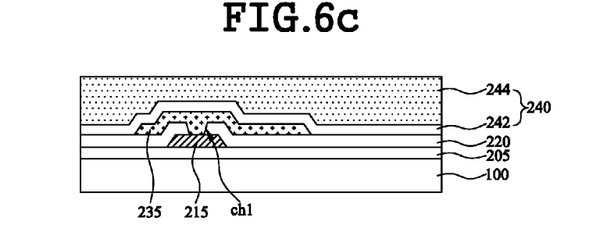

Next, as shown in FIG. 6c, an inorganic film 242 and an organic film 244 are deposited on the first connection electrode 235 in serial order to form a first passivation film 240.

Figure 6D:
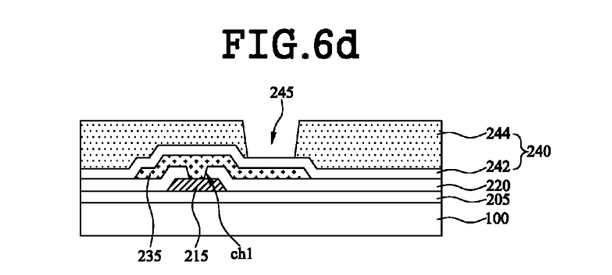

As shown in FIG. 6d, an opening 245 is formed in the organic film 244 of the first passivation film 240.

Figure 6E:
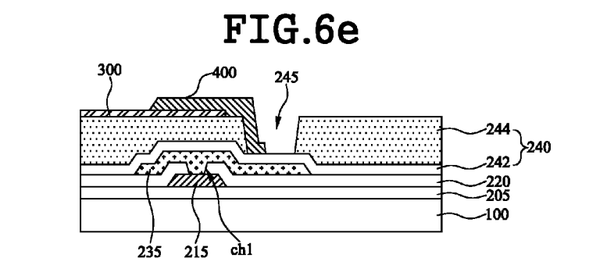

Next, as shown in FIG. 6e, a common electrode 300 is patterned on the organic film 244 of the first passivation film 240, and a sensing line 400 is patterned on the common electrode 300.

The common electrode 300 is not formed in the opening 245 of the organic film 244, and the sensing line 400 is extended to the opening 245 of the organic film 244. In this way, as the sensing line 400 is extended to the opening 245, a contact area between the sensing line 400 and the second connection electrode may be increased during a later process.

Figure 6F:
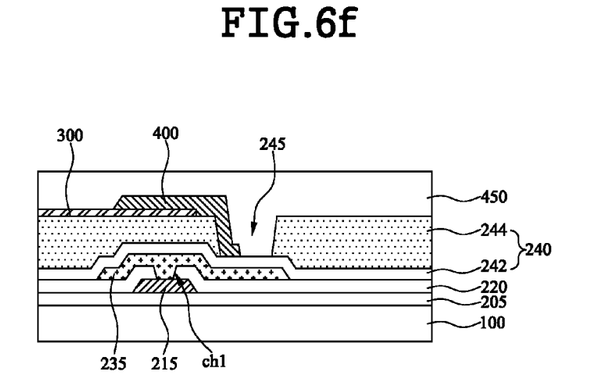

Next, as shown in FIG. 6f, the second passivation film 450 is formed on the sensing line 400.

The second passivation film 450 is also formed in the opening 245 of the organic film 244.

Figure 6G:
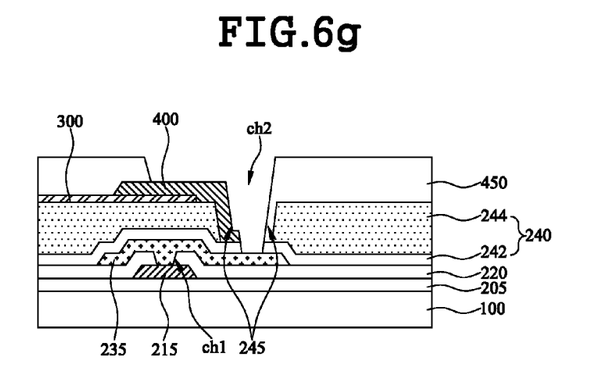

As shown in FIG. 6g, the predetermined region of the second passivation film 450 and the predetermined region of the inorganic film 242 of the first passivation film 240 are removed to form a second contact hole ch2.

The sensing line 400 and the first connection electrode 235 are exposed by the second contact hole ch2.

Since the second passivation film 450 is generally formed of an inorganic film, the predetermined region of the second passivation film 450 and the predetermined region of the inorganic film 242 of the first passivation film 240 may simultaneously be removed by an etching process of one time.

The second contact hole ch2 may be formed simultaneously with a contact hole formed to connect the pixel electrode with the drain electrode of the thin film transistor. Accordingly, a separate process for the second contact hole ch2 is not required additionally.

Figure 6H:
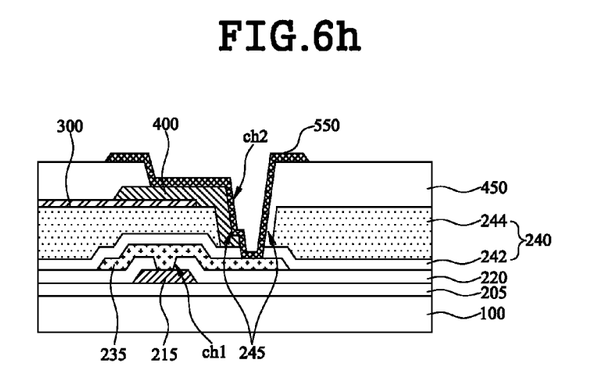

Next, as shown in FIG. 6h, a second connection electrode 550 connected with the sensing line 400 and the first connection electrode 235 through the second contact hole ch2 is formed.

The second connection electrode 550 may be formed simultaneously with the pixel electrode. Accordingly, a separate process for forming the second connection electrode 550 is not required additionally.

FIGS. 7a to 7h are cross-sectional views illustrating a method for manufacturing a lower substrate for a liquid crystal display device according to another embodiment of the present invention, and are directed to a method for manufacturing a lower substrate for the liquid crystal display device according to FIG. 5b. The same description as that of the aforementioned embodiment will be omitted.

Figure 7A:
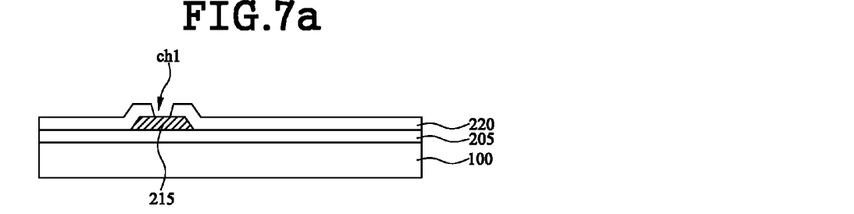

First, as shown in FIG. 7a, a gate insulating film 205 is formed on a substrate 100, and a jump line 215 is patterned on the gate insulating film 205. After a interlayer insulating film 220 is formed on the jump line 215, a first contact hole ch1 is formed in the interlayer insulating film 220 to expose the jump line 215.

Figure 7B:
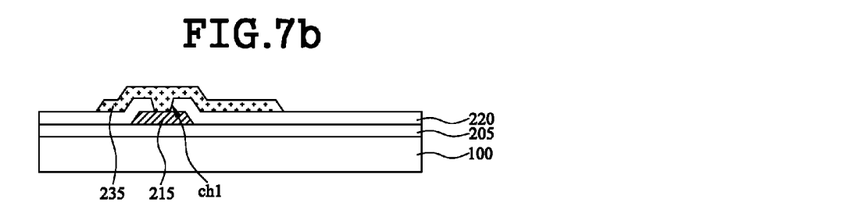

Next, as shown in FIG. 7b, a first connection electrode 235 connected with the jump line 215 through the first contact hole ch1 is formed.

Figure 7C:
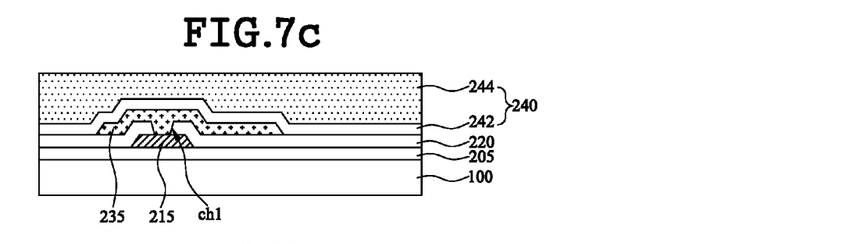

Next, as shown in FIG. 7c, an inorganic film 242 and an organic film 244 are deposited on the first connection electrode 235 in serial order to form a first passivation film 240.

Figure 7D:
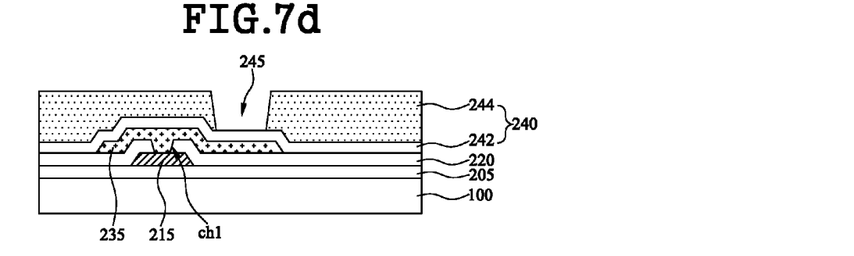

As shown in FIG. 7d, an opening 245 is formed in the organic film 244 of the first passivation film 240.

Figure 7E:
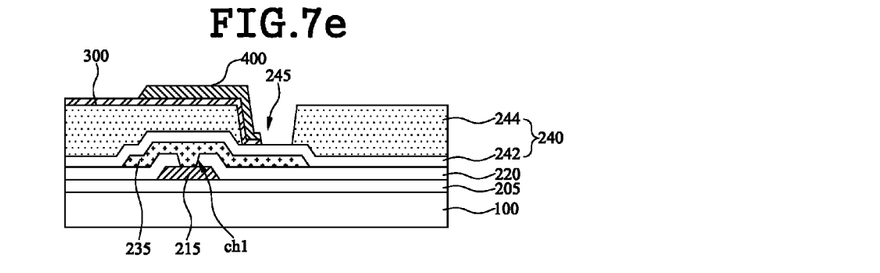

Next, as shown in FIG. 7e, a common electrode 300 is patterned on the organic film 244 of the first passivation film 240, and a sensing line 400 is patterned on the common electrode 300.

Both the common electrode 300 and the sensing line 400 are extended to the opening 245 of the organic film 244.

Figure 7F:
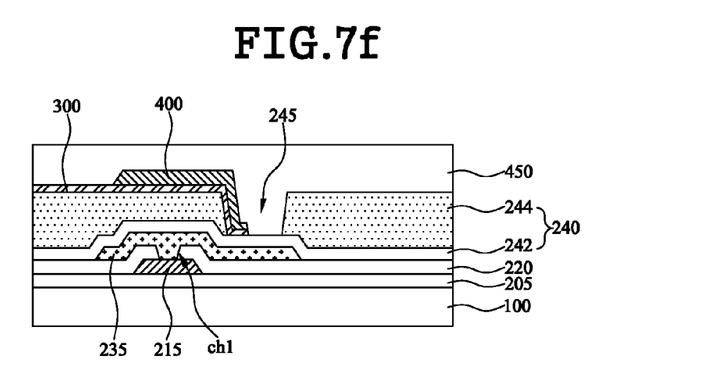

Next, as shown in FIG. 7f, a second passivation film 450 is formed on the sensing line 400.

Figure 7G:
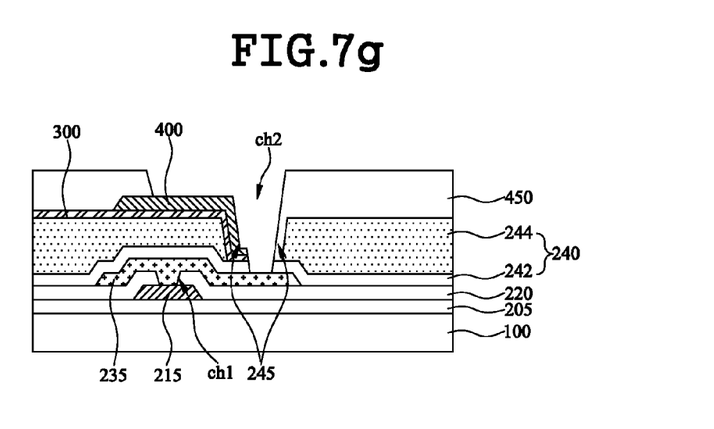

As shown in FIG. 7g, the predetermined region of the second passivation film 450 and the predetermined region of the inorganic film 242 of the first passivation film 240 are removed to form a second contact hole ch2, whereby the sensing line 400 and the first connection electrode 235 are exposed.

Figure 7H:
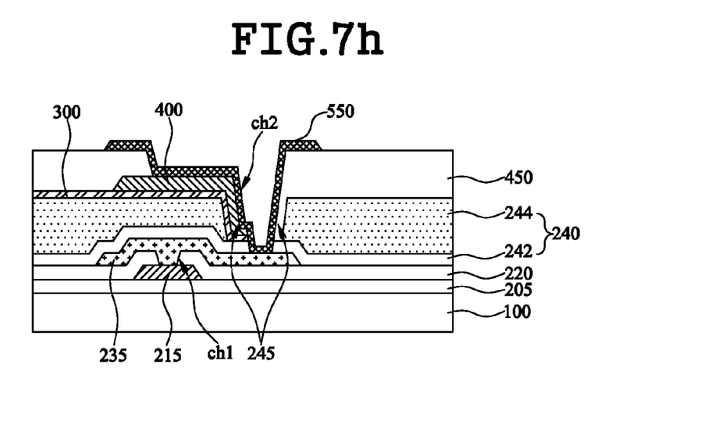

Next, as shown in FIG. 7h, a second connection electrode 550 connected with the sensing line 400 and the first connection electrode 235 through the second contact hole ch2 is formed.

The lower substrate constituting the liquid crystal display device according to the present invention has been described as above. The liquid crystal display device according to the present invention includes the aforementioned lower substrate, an upper substrate and a liquid crystal layer formed between these substrates.

The upper substrate includes light shielding layers for shielding light from leakage to a region other than the pixel region, color filter layers of red (R), green (G) and blue (B) formed between the light shielding layers, and an overcoat layer formed on the color filter layers.

Although the manufacturing process of the lower substrate for the liquid crystal display device according to the present invention has been described as above, the liquid crystal display device of the present invention may be manufactured by the process steps of forming the lower substrate as above, forming the upper substrate in which the light shielding layers, the color filter layers and the overcoat layer are sequentially formed, and forming the liquid crystal layer between the lower substrate and the upper substrate.

The process for forming the liquid crystal layer between the lower substrate and the upper substrate may be performed by a liquid crystal injection method or a liquid crystal dispensing method, which is known in the art.

As described above, the liquid crystal display device and the method for manufacturing the same according to the present invention have the following advantages.

Since the common electrode used to form an electric field for driving a liquid crystal is used as a sensing electrode for sensing a touch of a user, a separate touch screen on the liquid crystal panel is not required unlike the related art, whereby the overall thickness of the liquid crystal display device is reduced, manufacturing process steps are simplified, and the manufacturing cost is reduced.

In addition, the jump line is electrically connected with the sensing line through the first connection electrode and the second connection electrode. Particularly, since one contact hole can be formed to connect the second connection electrode with the first connection electrode and the sensing line respectively, the length of the second connection electrode can be reduced, whereby an aperture ratio can be increased.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
gate and data lines arranged to cross each other on a substrate to define a plurality of pixels;
a pixel electrode formed in each of the plurality of pixels;
a common electrode forming an electric field together with the pixel electrode, patterned to sense a touch of a user;
a sensing line discontinuously formed on the common electrode and electrically connected with the common electrode;
a jump line formed below the common electrode to electrically connect the discontinuous portions of the sensing line with one another; and
first and second connection electrodes for electrically connecting the jump line with the sensing line,
wherein the first connection electrode is connected with the jump line, and the second connection electrode is connected with the sensing line and the first connection electrode respectively,
wherein the first connection electrode is connected with the jump line through a first contact hole, and the second connection electrode is connected with the sensing line and the first connection electrode respectively through a second contact hole,
wherein the second contact hole is provided in a first passivation film formed between the first connection electrode and the sensing line, and
wherein the first passivation film is formed of an inorganic film formed on the first connection electrode and an organic film formed on the inorganic film, the organic film is provided with an opening, and the sensing line is extended into the opening.

2. The liquid crystal display device of claim 1, wherein the first contact hole is provided in an interlayer insulating film formed between the jump line and the first connection electrode, and the second contact hole is further provided in a second passivation film formed between the sensing line and the second connection electrode.

3. The liquid crystal display device of claim 1, wherein the common electrode is additionally extended into the opening.

4. The liquid crystal display device of claim 1, wherein the jump line is formed of the same material as that of the gate line in the same layer as the gate line, the first connection electrode is formed of the same material as that of the data line in the same layer as the data line, and the second connection electrode is formed of the same material as that of the pixel electrode in the same layer as the pixel electrode.

5. The liquid crystal display device of claim 1, wherein the pixel electrode includes at least one slit therein, and the sensing line and the jump line are parallel with the gate line and are formed in a region where disclination occurs.

6. A method for manufacturing a liquid crystal display device, the method comprising the steps of:
patterning a jump line on a substrate;
forming an interlayer insulating film on the jump line;
forming a first contact hole in the interlayer insulating film to expose the jump line;
forming a first connection electrode connected with the jump line through the first contact hole;

forming a first passivation film by sequentially depositing an inorganic film and an organic film on the first connection electrode;

forming an opening in the organic film of the first passivation film;

patterning a common electrode on the organic film of the first passivation film and patterning a sensing line on the common electrode;

forming a second passivation film on the sensing line;

forming a second contact hole to expose the sensing line and the first connection electrode by removing a predetermined region of the second passivation film and a predetermined region of the inorganic film of the first passivation film; and forming a second connection electrode connected with the sensing line and the first connection electrode through the second contact hole, wherein the sensing line is extended into the opening of the organic film.

7. The method of claim 6, wherein the common electrode is not formed in the opening of the organic film.

8. The method of claim 6, wherein the common electrode is extended to the opening of the organic film.

* * * * *